United States Patent [19]
Lynch et al.

[11] Patent Number: 5,829,028
[45] Date of Patent: Oct. 27, 1998

[54] DATA CACHE CONFIGURED TO STORE DATA IN A USE-ONCE MANNER

[75] Inventors: Thomas W. Lynch; Christopher J. Yard, both of Austin, Tex.

[73] Assignee: Advanced Micro Devices, Inc., Sunnyvale, Calif.

[21] Appl. No.: 643,343

[22] Filed: May 6, 1996

[51] Int. Cl.$^6$ .................................................... G06F 12/08
[52] U.S. Cl. ........................... 711/126; 711/137; 711/120
[58] Field of Search ................................... 711/126, 120, 711/137

[56] References Cited

U.S. PATENT DOCUMENTS

| 3,845,474 | 10/1974 | Lange et al. ........................... 711/119 |
| 4,731,737 | 3/1988 | Witt et al. . |
| 5,404,484 | 4/1995 | Schlansker et al. ..................... 711/133 |
| 5,664,147 | 9/1997 | Mayfield ................................. 711/137 |

OTHER PUBLICATIONS

"Am95C85 Content Addressable Data Manager", AMD Literature Department, Aug. 1989, pp. 2–226 thru 2–249.
Palacharla et al., "Evaluating Stream Buffers as a Secondary Cache Replacement", IEEE, 1063–6897/94, p. 26, 1994.
Zucker et al., "A Comparison of Hardware Prefetching Techniques For Multimedia Benchmarks", IEEE, 0–8186–7436–9/96, 241–243, Sep. 1996.
Chan et al., "Pyramid–Structured Multiprocessor System for Image Processing", IEEE, 87CH2518–9, pp. 149–152, 1987.

Primary Examiner—Tod R. Swann
Assistant Examiner—Felix B. Lee
Attorney, Agent, or Firm—Conley, Rose & Tayon, PC; B. Noel Kivlin

[57] ABSTRACT

A cache is provided which prefetches data words associated with a particular addressing mode. When a data word is accessed in response to the execution of an instruction, the data word is discarded by the cache. Data which is accessed in a use-once fashion (such as DSP data, for example) may be thereby available with cache-hit memory access times instead of main memory access times. The present cache prefetches data words spaced at regular or irregular intervals, wherein the interval is specified by the addressing mode of the instruction. Multiple words within a data stream may be successfully prefetched. The cache described herein may be incorporated into a microprocessor having a conventional cache as well. Data which is indicated to be used once may be stored in the present cache, while data exhibiting locality may be stored in the conventional cache. Data which exhibits locality is thereby retained within the cache system when use-once data is accessed.

27 Claims, 6 Drawing Sheets

DATA CACHE CONFIGURED TO STORE DATA IN A USE-ONCE MANNER

BACKGROUND OF THE INVENTION

1. Field of the Invention

This invention relates to the field of microprocessors and, more particularly, to data caches used in microprocessors wherein certain data streams are stored in a use-once manner.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. Many of these mathematical algorithms perform a repetitive multiply and accumulate function in which a pair of operands are multiplied together and added to a third operand. The third operand is often used to store an accumulation of prior multiplications. Therefore, DSPs often include hardware configured to quickly perform a multiply-add sequence. An exemplary DSP is the ADSP 2171 available from Analog Devices, Inc. of Norwood, Mass.

As microprocessors continue to increase in performance due to increases in operating frequency and the number of transistors which may be included upon a single semiconductor substrate, it becomes desirable to perform certain DSP functions within the microprocessor. Instruction code written in the x86 instruction set, for example, may perform the mathematical operations that DSPs typically perform even though the instruction set is not optimized for performing such operations (e.g. x86 instructions coded to perform a DSP function may be larger in number than instructions from a DSP instruction set coded to perform that DSP function). Cost of the computer system may be reduced through the elimination of one or more DSPs while still performing equivalent functionality.

DSPs often operate upon a large number of operands stored in a memory. In particular, DSPs often operate upon a memory operand once, and then do not utilize that memory operand again. For example, memory operands may comprise digital samples of an analog signal. The samples are operated upon to perform a function (such as filtering the signal), and then new samples are operated upon. Unfortunately, microprocessors are optimized for storage of data that is used repetitively. For example, microprocessors are often configured with caches which store data recently referenced by the microprocessor. The data is stored under the presumption that the data (or some other data within a cache line containing the data) will be referenced again. DSP data often is not accessed in this manner. It is noted that the term "locality of reference" or "locality" is used to refer to program behavior in which data, once accessed, is accessed again or that nearby data is accessed. It is further noted that the term "cache hit" or "hit" refers to finding data associated with an address stored within the cache. Conversely, the term "cache miss" or "miss" refers to not finding data associated with an address stored within the cache.

A cache optimized for programs which exhibit locality may discard data in favor of DSP data accessed by a DSP function when the DSP function is executed and accesses the DSP data. The DSP data is not referenced again, but data that was discarded may be referenced again. Performance of the microprocessor and the computer system may be decreased to the degree that useful data is discarded by the cache in favor of DSP data. A cache system optimized for DSP data access patterns is desired.

SUMMARY OF THE INVENTION

The problems outlined above are in large part solved by a cache in accordance with the present invention. The cache prefetches data words associated with a particular addressing mode. When a data word is accessed in response to the execution of an instruction, the data word is discarded by the cache. Advantageously, data which is accessed in a use-once fashion (such as DSP data, for example) may be available with cache-hit memory access times instead of main memory access times. Performance of a microprocessor employing the cache may be increased to the degree that data is accessed in the use-once fashion. One embodiment of the present cache prefetches data words spaced at regular intervals, wherein the interval is specified by the addressing mode of the instruction. Multiple words within a data stream may be successfully prefetched, offering still further improved average memory access times by increasing the number of hits in the cache. Another embodiment of the present cache prefetches data according to a variable interval.

The cache described herein may be incorporated into a microprocessor having a conventional cache as well. Data which is indicated to be used once may be stored in the present cache, while data exhibiting locality may be stored in the conventional cache. Advantageously, data which exhibits locality is retained within the cache system when use-once data is accessed. Performance may be increased to the degree that data exhibiting locality was previously discarded from a conventional cache when accessing the use-once data.

Broadly speaking, the present invention contemplates a cache comprising a first bus, a storage, and a control unit. The first bus is configured to convey an address. The storage comprises a plurality of storage locations, wherein each of the storage locations is configured to store one of a plurality of data words. Each one of the plurality of data words is separated in memory from another one of the plurality of data words by one of a plurality of regular intervals. Coupled to the storage and to the first bus, the control unit is configured to provide one of the plurality of data words upon a second bus if the data word corresponds to the address. Additionally, the control unit is configured to delete the data word from the storage upon access by the address.

The present invention further contemplates a microprocessor comprising a first and second data cache and a load/store unit. The first data cache is configured to store first data for access by the microprocessor in response to instructions executed by the microprocessor. The first data cache is configured to retain the first data when the first data is accessed by the microprocessor. The second data cache is configured to store second data for access by the microprocessor in response to instructions executed by the microprocessor. The second data cache is configured to discard the second data when the second data is accessed by the microprocessor. Coupled to both data caches, the load/store is configured to access the first data cache and the second data cache in response to load memory operations.

The present invention still further contemplates a method for operating a data cache comprising several steps. Data is transferred from a main memory to the data cache. The data comprises a plurality of data words wherein each one of the plurality of data words is separated within the main memory from another one of the plurality of data words by a regular interval. The plurality of data words is accessed in response to execution of an instruction. The accessed data word is discarded from the data cache.

BRIEF DESCRIPTION OF THE DRAWINGS

Other objects and advantages of the invention will become apparent upon reading the following detailed description and upon reference to the accompanying drawings in which.

Figure 1:
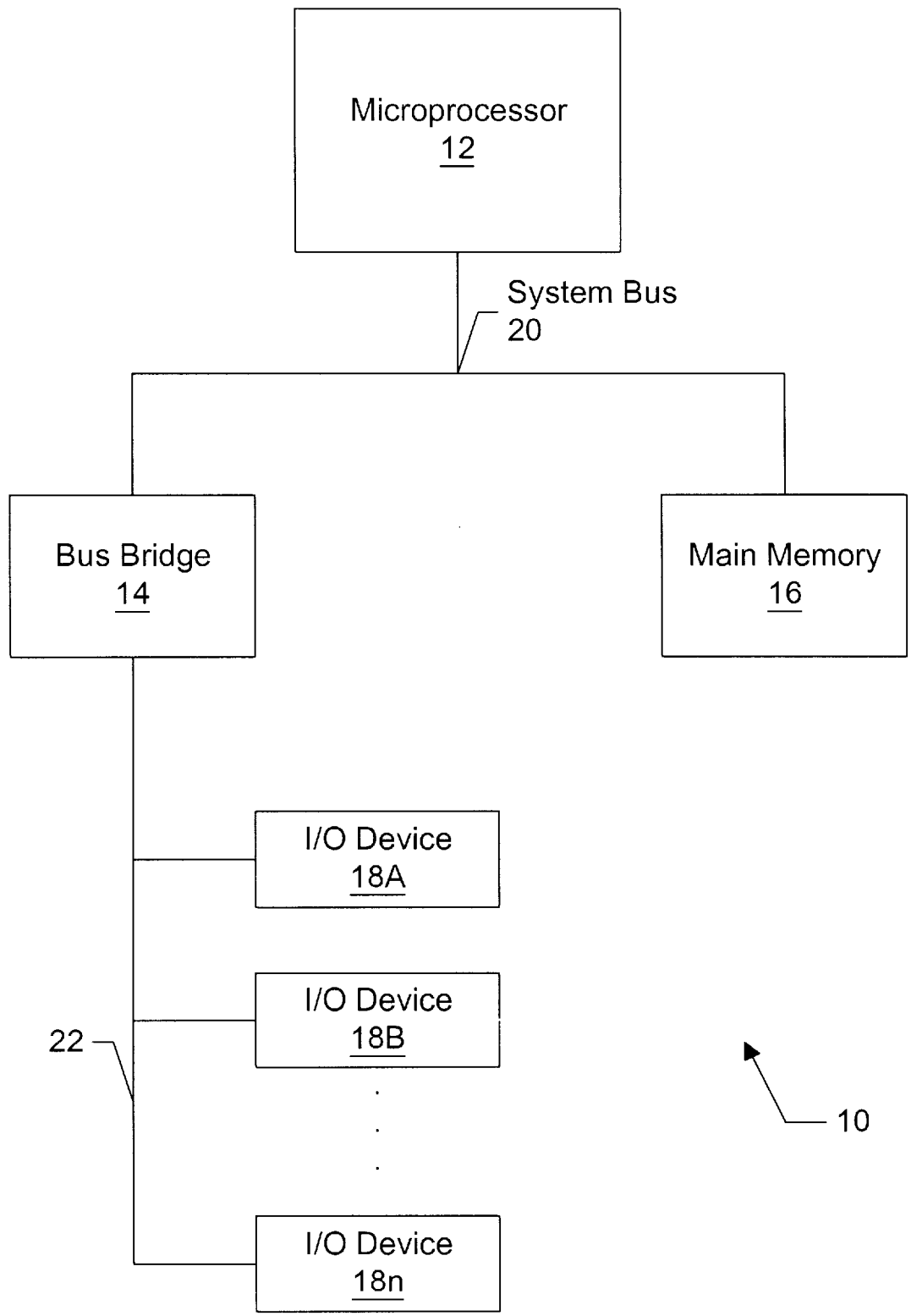
FIG. 1 is a block diagram of a computer system including a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 is shown. Computer system 10 includes a microprocessor 12, a bus bridge 14, a main memory 16, and a plurality of input/output (I/O) devices 18A–18N (collectively referred to as I/O devices 18). A system bus 20 couples microprocessor 12, bus bridge 14, and main memory 16. I/O devices 18A–18N are coupled to bus bridge 14 via an I/O bus 22.

Generally speaking, microprocessor 12 executes sequences of instructions ("programs") stored in main memory 16 and operates upon data stored in main memory 16. Microprocessor 12 includes a data cache and a use-once cache. The use-once cache stores data predicted to be accessed by microprocessor 12, as opposed to the data cache which typically stores data previously accessed by microprocessor 12. In one embodiment, when microprocessor 12 executes an instruction which utilizes a base/index addressing mode, then the use-once cache prefetches data which would be accessed if the index value is incremented and the instruction is executed again. In another embodiment, when microprocessor 12 executes several instructions using the base/index addressing mode, the intervals between the accesses are detected and used to prefetch data. The data thus fetched is stored in the use-once cache. When microprocessor 12 executes an instruction which accesses memory, the use-once cache is searched along with the data cache. If data corresponding to the memory access is stored in the use-once cache, the data is provided by the use-once cache. In addition, the use-once cache discards the data. Advantageously, data which is referenced once (i.e. data accessed by a program that does not exhibit locality) is stored in the use-once cache, and other data is stored in the data cache. Data for DSP functions may be stored in the use-once cache while data for other functions may be stored in the data cache. Useful data stored in the data cache is not discarded in favor of the DSP data. In addition, DSP data is prefetched. The DSP data may be available in the use-once cache when accessed, thereby providing memory access times associated with a cache hit (as opposed to the significantly longer memory access times associated with fetching the data from main memory 16).

The above discussion assumes that a particular addressing mode is indicative of a use-once data access pattern in which a particular datum is accessed once (i.e. the access pattern does not exhibit locality). The particular addressing mode may be coded for memory accesses to data which is used once, such as DSP data. Other addressing modes may be coded for memory accesses to data which does exhibit locality. Additionally, a configuration register bit may be defined for microprocessor 12 which determines whether or not the use-once cache is enabled. Therefore, a program which uses the addressing mode detected by the use-once cache but whose memory accesses exhibit locality may disable the use-once cache. The use-once cache may be enabled or disabled for a particular program, or for a particular function within the program, according to the programmer's needs.

A base/index addressing mode refers to an addressing mode for an instruction in which a pair of register operands are used to form a memory address of a memory operand for the instruction. The base value is stored in one register, while the index value is stored in another register. The base and index values are added to form the address of the memory operand. According to one embodiment, the index value may be scaled (i.e. multiplied) by a particular value prior to being added to the base. The scale value is specified by the instruction along with the base and index registers. Often, the base value is held constant and the index value is incremented or decremented in order to form the address of subsequent memory operands. Since base/index addressing may be beneficial for accessing DSP data (which is often separated by a regular interval such as the repetitive incrementing and scaling of an index value provides), this addressing mode is detected by the use-once cache for determining which data to prefetch and store. It is noted that an "operand" of an instruction refers to a value upon which the instruction is intended to operate in order to produce a result. A register operand is stored in a register, and a memory operand is stored in a memory location. It is further noted that the term "addressing mode" refers to one of several methods for forming the address of a memory operand. In addition to the base/index addressing mode, addressing modes may include a register plus displacement addressing mode, etc.

In one embodiment, microprocessor 12 employs the x86 microprocessor architecture. The x86 microprocessor architecture specifies a base/index addressing mode for an instruction by including a scale-index-base (SIB) byte. The SIB byte specifies the registers storing the index and base values, as well as the scale value to apply to the index prior to forming the address of the memory operand. The scale value may be 1, 2, 4, or 8.

Bus bridge 14 is provided to assist in communications between I/O devices 18 and devices coupled to system bus 20. I/O devices 18 typically require longer bus clock cycles than microprocessor 12 and other devices coupled to system bus 20. Therefore, bus bridge 14 provides a buffer between system bus 20 and input/output bus 22. Additionally, bus bridge 14 translates transactions from one bus protocol to another. In one embodiment, input/output bus 22 is an Enhanced Industry Standard Architecture (EISA) bus and bus bridge 14 translates from the system bus protocol to the EISA bus protocol. In another embodiment, input/output bus 22 is a Peripheral Component Interconnect (PCI) bus and bus bridge 14 translates from the system bus protocol to the PCI bus protocol. It is noted that many variations of system bus protocols exist. Microprocessor 12 may employ any suitable system bus protocol.

I/O devices 18 provide an interface between computer system 10 and other devices external to the computer system. Exemplary I/O devices include a modem, a serial or parallel port, a sound card, etc. I/O devices 18 may also be referred to as peripheral devices. Main memory 16 stores data and instructions for use by microprocessor 12. In one embodiment, main memory 16 includes at least one Dynamic Random Access Memory (DRAM) cell and a DRAM memory controller.

It is noted that although computer system 10 as shown in FIG. 1 includes one microprocessor, other embodiments of computer system 10 may include multiple microprocessors similar to microprocessor 12. Similarly, computer system 10 may include multiple bus bridges 14 for translating to multiple dissimilar or similar I/O bus protocols. Still further, a cache memory for enhancing the performance of computer system 10 by storing instructions and data referenced by microprocessor 12 in a faster memory storage may be included. The cache memory may be inserted between microprocessor 12 and system bus 20, or may reside on system bus 20 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Figure 2:
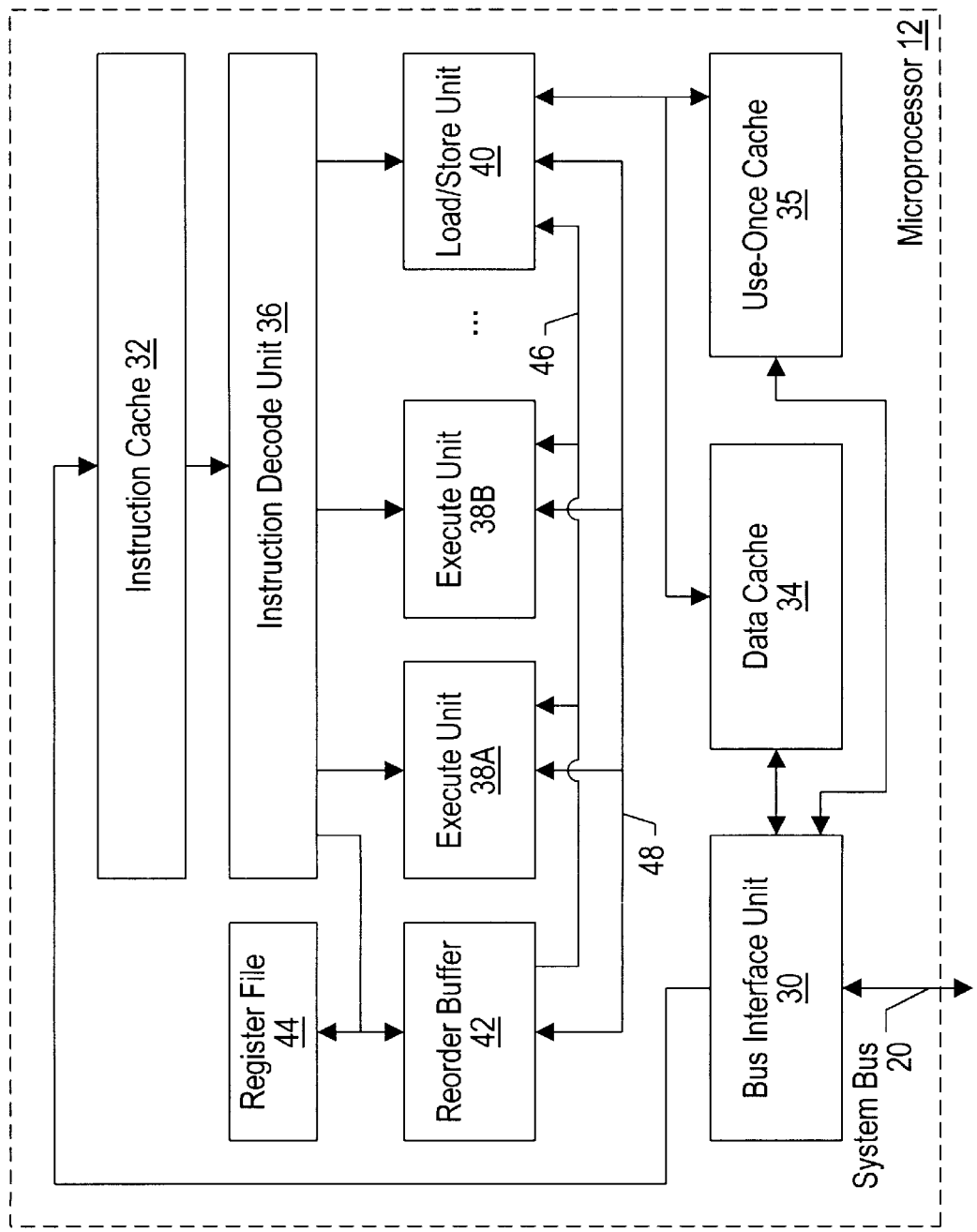
FIG. 2 is a block diagram of one embodiment of the microprocessor shown in FIG. 1, including a use-once data cache.

Turning now to FIG. 2, a block diagram of one embodiment of microprocessor 12 is shown. Microprocessor 12 includes a bus interface unit 30, an instruction cache 32, a data cache 34, a use-once cache 35, an instruction decode unit 36, a plurality of execute units including execute units 38A and 38B, a load/store unit 40, a reorder buffer 42, and a register file 44. The plurality of execute units will be collectively referred to herein as execute units 38, and may include more execute units than execute units 38A and 38B shown in FIG. 2. Additionally, an embodiment of microprocessor 12 may include one execute unit 38. Bus interface unit 30 is coupled to instruction cache 32, data cache 34, use-once cache 35, and system bus 20. Instruction cache 32 is coupled to instruction decode unit 36, which is further coupled to execute units 38, reorder buffer 42, and load/store unit 40. Reorder buffer 42, execute units 38, and load/store unit 40 are each coupled to a result bus 48 for forwarding of execution results. Load/store unit 40 is coupled to data cache 34 and use-once cache 35.

Generally speaking, use-once cache 35 is configured to receive addresses of memory operations from load/store unit 40. If data corresponding to the addresses is stored in use-once cache 35, then use-once cache 35 transmits the data to load/store unit 40. Additionally, use-once cache 35 discards the data. If data corresponding to a particular address is not stored in use-once cache 35 and the address is formed using an addressing mode which is indicative of data which is used once, the data is fetched from main memory. Additionally, use-once cache 35 prefetches data which is likely to be accessed by a subsequent execution of an instruction utilizing the same addressing mode. An indication of the addressing mode employed to form a particular address is conveyed with the address from load/store unit 40 to use-once cache 35. In one embodiment, the base/index addressing mode is detected by use-once cache 35 as indicative of data that is used once. Data is prefetched from addresses formed by incrementing the index value and adding it to the base. Instead of conveying the index value and the base value to use-once cache 35, the scale value is conveyed. By adding the scale value to the address provided by load/store unit 40, the effect of incrementing the index value, scaling the index value by the scale value, and adding the scaled index value to the base value is achieved. The equivalence of adding the scale value to the address may be seen in the following equations:

$$[Index * Scale+Base]=current\ address \quad (1)$$

$$[(Index+1) * Scale+Base]=next\ address \quad (2)$$

$$[Index * Scale+Scale+Base]=next\ address \quad (3)$$

$$[current\ address+Scale]=next\ address \quad (4)$$

Equation 3 is equation 2 after multiplying out the (Index+1) * Scale term. Equation 4 is equation 3, substituting the equality of equation 1 for terms on the left hand side.

Use-once cache 35 is configured to prefetch multiple addresses by adding the scale value to the original address and then subsequently to the previously prefetched address. In this manner, use-once cache 35 stores data which is stored in main memory at addresses separated from one another by a regular interval (i.e. the scale value defines the interval). Dependent upon the size (in bytes) of the data retrieved by the memory operations utilizing the base/index addressing mode and the scale value, the data may be contiguous or discontiguous in main memory (i.e. the regular interval separating the data may be as small as zero, and may be one of several integer values). A set of data which is separated by regular intervals and is accessed by microprocessor 12 in a use-once fashion (according to a program execution thereon) may be referred to as a "stream" of data.

It is noted that in one embodiment, if data corresponding to the address is not stored in use-once cache 35 but is stored in data cache 34, then the data is not prefetched by use-once cache 35. Instead, the data from data cache 34 is used. It is further noted that data cache 34 receives the indication of the addressing mode as well. If the address is a miss in data cache 34, data cache 34 does not request the data to be fetched from main memory if the addressing mode indicates that the data should be stored by use-once cache 35.

In another embodiment, use-once cache 35 calculates the difference between consecutive memory accesses using base/index addressing. The strides calculated are repetitively used to prefetch data into use-once cache 35. Advantageously, multiple irregular intervals may be detected by use-once cache 35. Such an embodiment may be useful when a code sequence is accessing a data structure. Certain portions of the data structure may not be accessed by the code sequence. This embodiment additionally detects regular intervals of any size. Advantageously, data referenced in a regular pattern of irregular intervals may be prefetched. Still further, use-once cache 35 may dynamically adjust its set of intervals to accommodate changes in the pattern. In this manner, irregular patterns of irregular intervals which occasionally generate regular patterns of irregular intervals may achieve performance benefits.

Instruction cache 32 is a high speed cache memory for storing instructions. It is noted that instruction cache 32 may be configured into a set-associative or direct mapped configuration. Instruction cache 32 may additionally include a branch prediction mechanism for predicting branch instructions as either taken or not taken. Instructions are fetched from instruction cache 32 and conveyed to instruction decode unit 36 for decode and dispatch to an execute unit 38.

Instruction decode unit 36 decodes instructions. As used herein, "decoding" refers to transforming the instruction from the format defined by the microprocessor architecture employed by microprocessor 12 into a second format expected by execute units 38. Often, the second format comprises decoded control signals for controlling data flow elements such as adders and multiplexors in order to perform the operation the instruction defines. In the embodiment shown, instruction decode unit 36 decodes each instruction fetched from instruction cache 32. Instruction decode unit 36 dispatches the instruction to execute units 38 and/or load/store unit 40. Instruction decode unit 36 also detects the register operands used by the instruction and requests these operands from reorder buffer 42 and register file 44. In one embodiment, execute units 38 are symmetrical execution units. Symmetrical execution units are each configured to execute a particular subset of the instruction set employed by microprocessor 12. The subsets of the instruction set executed by each of the symmetrical execution units are the same. In another embodiment, execute units 38 are asymmetrical execution units configured to execute dissimilar instruction subsets. For example, execute units 38 may include a branch execute unit for executing branch instructions, one or more arithmetic/logic units for executing arithmetic and logical instructions, and one or more floating point units for executing floating point instructions. Instruction decode unit 36 dispatches an instruction to an execute unit 38 or load/store unit 40 which is configured to execute that instruction.

Load/store unit 40 provides an interface between execute units 38, data cache 34 and use-once cache 35. Load memory operations are performed by load/store unit 40 to data cache 34 and use-once cache 35 in parallel. If data is found in either cache, then the data is forwarded to execute units 38 and reorder buffer 42. Store memory operations are performed to data cache 34, and use-once cache 35 discards the associated data if the data is stored therein. Additionally, memory dependencies between load and store memory operations are detected and handled by load/store unit 40.

Execute units 38 and load/store unit 40 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservation stations. The centralized reservation station is coupled between instruction decode unit 36, execute units 38, and load/store unit 40. Such an embodiment may perform the dispatch function within the centralized reservation station.

Microprocessor 12 supports out of order execution, and employs reorder buffer 42 for storing execution results of speculatively executed instructions and for storing these results into register file 44 in program order; for performing dependency checking and register renaming; and for providing for mispredicted branch and exception recovery. When an instruction is decoded by instruction decode unit 36, requests for register operands are conveyed to reorder buffer 42 and register file 44. In response to the register operand requests, one of three values is transferred to the execute unit 38 and/or load/store unit 40 which receives the instruction: (1) the value stored in reorder buffer 42, if the value has been speculatively generated; (2) a tag identifying a location within reorder buffer 42 which will store the result, if the value has not been speculatively generated; or (3) the value stored in the register within register file 44, if no instructions within reorder buffer 42 modify the register. Additionally, a storage location within reorder buffer 42 is allocated for storing the results of the instruction being decoded by instruction decode unit 36. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register. Tags and/or operand values are conveyed upon an operand tags/value bus 46.

When execute units 38 or load/store unit 40 execute an instruction, the tag assigned to the instruction by reorder buffer 42 is conveyed upon result bus 48 along with the result of the instruction. Reorder buffer 42 stores the result in the indicated storage location. Additionally, execute units 38 and load/store unit 40 compare the tags conveyed upon result bus 48 with tags of operands for instructions stored therein. If a match occurs, the unit captures the result from result bus 48 and stores it with the corresponding instruction. In this manner, an instruction may receive the operands it is intended to operate upon. Capturing results from result bus 48 for use by instructions is referred to as "result forwarding".

Instruction results are stored into register file 44 by reorder buffer 42 in program order. Storing the results of an instruction and deleting the instruction from reorder buffer 42 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 42 discards the instructions subsequent to the mispredicted branch instructions. Instructions thus discarded are also flushed from execute units 38, load/store unit 40, and instruction decode unit 36.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Register file 44 includes storage locations for each register defined by the microprocessor architecture employed by microprocessor 12. For example, microprocessor 12 may employ the x86 microprocessor architecture. For such an embodiment, register file 44 includes locations for storing the EAX, EBX, ECX, EDX, ESI, EDI, ESP, and EBP register values.

Data cache 34 is a high speed cache memory configured to store data to be operated upon by microprocessor 12. It is noted that data cache 34 may be configured into a set-associative or direct-mapped configuration.

Bus interface unit 30 is configured to effect communication between microprocessor 12 and devices coupled to system bus 20. For example, instruction fetches which miss instruction cache 32 may be transferred from main memory 16 by bus interface unit 30. Similarly, memory operations performed by load/store unit 40 which miss data cache 34 and use-once cache 35 may be transferred from main memory 16 by bus interface unit 30. Additionally, data cache 34 may discard a cache line of data which has been modified by microprocessor 12. Bus interface unit 30 transfers the modified line to main memory 16.

It is noted that instruction decode unit 36 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 34, executing the instruction, and transferring the result to memory (if the destination operand is a memory location). Load/store unit 40 performs the memory transfers, and an execute unit 38 performs the execution of the instruction. It is further noted that instruction decode unit 36 may be configured to decode multiple instructions per clock cycle. In one embodiment, instruction decode unit 36 is configured to decode and dispatch up to one instruction per execute unit 38 and load/store unit 40 per clock cycle.

Figure 3:
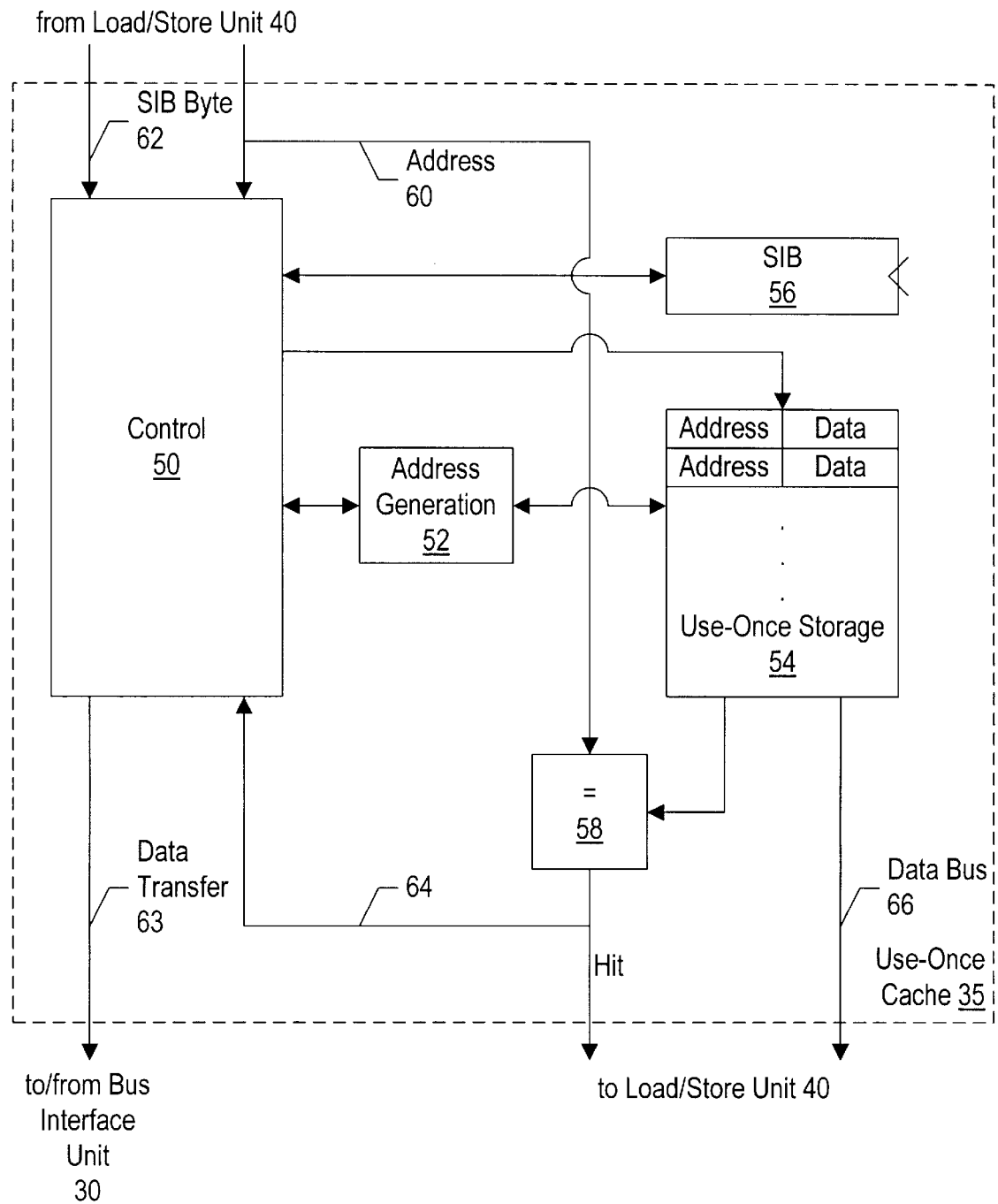
FIG. 3 is a block diagram of one embodiment of the use-once data cache shown in FIG. 2.

Turning now to FIG. 3, a block diagram of one embodiment of use-once cache 35 is shown. The embodiment shown is suitable for inclusion in embodiments of microprocessor 12 employing the x86 microprocessor architecture. Other embodiments are contemplated for use with other microprocessor architectures. As shown in FIG. 3, use-once cache 35 includes a control unit 50, an address generation unit 52, a use-once storage 54, an SIB register 56, and a comparator circuit 58. Control unit 50 is coupled to address generation unit 52, use-once storage 54, SIB register 56, and comparator circuit 58. Additionally, control unit 50 receives an address bus 60 and an SIB byte bus 62 from load/store unit 40 and a data transfer bus 63 from bus interface unit 30. Address bus 60 is additionally coupled to comparator circuit 58, which produces a hit line 64. Hit line 64 is coupled to load/store unit 40 and to control unit 50. Comparator circuit 58 is coupled to one of a plurality of storage locations within use-once storage 54, and the data stored in that storage location is conveyed upon a data bus 66.

Use-once cache 35 stores data words in use-once storage 54. A "data word" refers to one or more bytes of data logically accessed by microprocessor 12 as a single unit. A data word may comprise 1, 2, or 4 bytes in one embodiment, depending upon the operand size employed by the instruction which forms the addresses stored in use-once cache 35. Storage locations within use-once storage 54 include sufficient storage for the largest possible data word accessed by microprocessor 12. Additionally, each storage location includes sufficient storage to store the address associated with the data word.

Use-once data cache 35 receives addresses upon address bus 60 from load/store unit 40. The received addresses are compared to the address stored within a storage location within use-once storage 54. If the comparison indicates equality, comparator circuit 58 asserts a hit signal upon hit line 64 to load/store unit 40. Data bus 66 is coupled to the same storage location as comparator circuit 58, forwarding the data word associated with the address compared by comparator circuit 58. Load/store unit 40 thereby receives the data word associated with the address conveyed upon address bus 60.

Hit line 64 is further coupled to control unit 50. When control unit 50 detects an asserted hit signal, control unit 50 discards the corresponding data word. In one embodiment, use-once storage 54 is configured as a First-In, First-Out (FIFO) buffer. Comparator circuit 58 and data bus 66 are coupled to the storage location at the "bottom" of the FIFO buffer (i.e. the storage location defined to store the data word which is prior to each of the other data words in the data stream stored in the FIFO buffer). When the hit is detected, control unit 50 causes the data stored in the FIFO buffer storage locations to shift down by one. The contents of each storage location are copied to the storage location which is in front of that storage location in the FIFO order. In this manner, the data word provided upon data bus 66 and the associated address are overwritten by the subsequent address and data word in the buffer.

Control unit 50 maintains information indicating which entry in the buffer contains the most recently stored data word (i.e. the "top" of the FIFO buffer). For example, control unit 50 may include a pointer which indicates that storage location at the top of the FIFO buffer. When the contents of the FIFO buffer are shifted to discard a data word, the pointer is adjusted to continue indicating the top of the buffer. Additionally, the pointer is adjusted when new data words are added to the FIFO buffer.

As opposed to shifting values down within use-once storage 54, use-once storage 54 may be configured as a circular buffer. A pair of pointers are used to indicate the top and bottom of use-once storage 54. Such an embodiment conveys the storage location currently forming the bottom of the buffer to comparator circuit 58.

In another embodiment, comparator circuits similar to comparator circuit 58 are included for each storage location within-use once storage 54. Data may be forwarded from and storage location, and then the storage location is marked as used. When the storage location becomes the bottom of the buffer, the data is discarded if marked used.

In addition to the address upon address bus 60, control unit 50 receives (upon SIB bus 62) the SIB byte of the instruction corresponding to the address. If the address misses use-once storage 54 and control unit 50 initiates the transfer of a stream of data words beginning at that address, then control unit 50 stores the SIB byte into SIB register 56. The scale field may be used by address generation unit 52 in order to generate additional addresses within the stream. Additionally, control unit 50 compares the SIB byte corresponding to a received address to the SIB byte stored in SIB register 56. If the address is a miss in use-once storage 54, then the comparison between the received SIB byte and the stored SIB byte may be used to distinguish between two possible types of misses. If the SIB bytes do not compare equal, then a new data stream is being accessed. Control unit 50 discards the data in use-once storage 54 and fetches data from the new data stream.

Alternatively, if the SIB bytes do compare equal, then the predicted data stream may be incorrect. For example, the program code may be adding a constant value to the index value, or may be decrementing the index value. In one embodiment, control unit 50 retains the data in use-once storage 54 upon such an occurrence. A subsequent memory operation may thereby hit in use-once storage 54. In another embodiment, control unit 50 discards the data in use-once storage 54 and calculates a new interval value for use by address generation unit 52 in prefetching data. The interval value is stored internal to control unit 50 and is substituted for the scale value by address generation unit 52.

When use-once storage 54 is not full, address generation unit 52 generates new addresses to be prefetched by use-once cache 35. In one embodiment, address generation unit 52 is configured to add the scale value associated with the current data stream to the address corresponding to the most recently stored data word within use-once storage 54. The prefetch address thus generated is prefetched from main memory 16 through bus interface unit 30. Control unit 50 may be configured with a buffer which stores a cache line of data. If the data word corresponding to an address generated by address generation unit 52 is stored in the buffer, then the data word is stored into use-once storage 54 as a newly prefetched data word. Otherwise, a cache line of data including the prefetched data word is transferred from main memory 16 into the buffer. In this manner, multiple transactions upon system bus 20 for the same cache line of data may be avoided while still prefetching data words.

Another embodiment of use-once cache 35 is contemplated in which multiple comparator circuits similar to comparator circuit 58 are included. Each comparator circuit is coupled to a respective one of the storage locations within use-once storage 54. A multiplexor is coupled between data bus 66 and use-once storage 54, such that data stored in any storage location may be selected for conveyance to load/store unit 40. The hit signals produced by the comparators serve as the select control lines on the multiplexor circuit, and are further logically ORed together to produce the hit signal upon hit line 64. Such an embodiment may be beneficial for use with a load/store unit 40 which executes load memory operations out-of-order. Furthermore, such an embodiment may enjoy more "hits" of data in cases where the index value is not merely incremented between executions of the instruction which accesses the data. In this embodiment, control unit 50 is configured to discard data words within use-once storage 54 which are prior to the data word which hits, and therefore use-once storage 54 is configured to shift data stored in its storage locations by an arbitrary number of positions in order to discard more than one data word per access.

Figure 4:
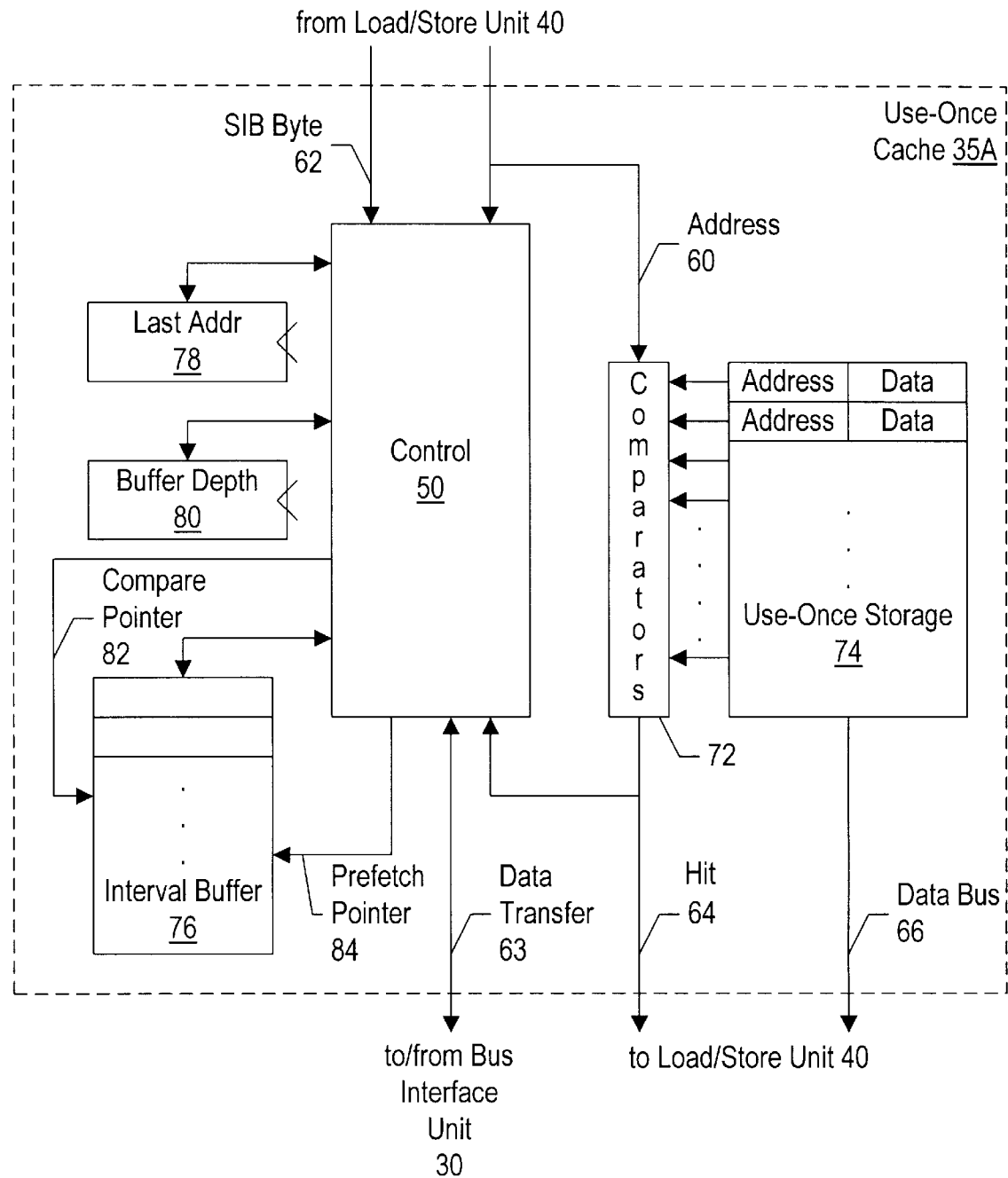
FIG. 4 is a block diagram of another embodiment of the use-once data cache shown in FIG. 2.

Turning now to FIG. 4, a second embodiment of use-once cache 35 (use-once cache 35A) is shown. Use-once cache 35A includes a control unit 70, a plurality of comparators 72, a use-once storage 74, an interval buffer 76, a last address register 78, and a buffer depth register 80. Control unit 70 is coupled to last address register 78, buffer depth register 80, interval buffer 76, hit line 64, data transfer bus 63, SIB byte bus 62, and address bus 60. Comparators 72 are coupled to address bus 60, hit line 64, and use-once storage 74. Use-once storage 74 is coupled to data bus 66.

Similar to use-once storage 54, use-once storage 74 stores data words and corresponding addresses. Comparators 72 compare the addresses stored in use-once storage 74 to the addresses upon address bus 60. If a match is detected, the corresponding data is conveyed upon data bus 66 and the hit signal upon hit line 64 is asserted. The matching data may be marked as used for later deletion or immediately deleted, according to various embodiments. Control unit 70 interfaces to bus interface unit 30 for transferring cache lines of data according to predicted addresses, and may include a buffer similar to control unit 50 for storing a cache line so that repeated transfers of data from the same cache line may be handled within use-once cache 35A.

Control unit 70 is configured to detect regular patterns of irregular intervals through the use of interval buffer 76. Control unit 70 calculates the difference between consecutive memory accesses conveyed upon address bus 60 if the addresses are associated with a base/index addressing mode (as indicated by an SIB byte conveyed upon SIB bus 62). The SIB bytes for the consecutive instructions may be dissimilar, as long as the base/index addressing mode is used. The calculated intervals are stored into interval buffer 76. Additionally, the address conveyed upon address bus 60 is stored in last address register 78, for use in calculating an interval when a subsequent address is conveyed upon address bus 60. Control unit 70 stores the number of valid intervals within interval buffer 76 in a buffer depth register 80.

Control unit 70 uses the intervals stored in interval buffer 76 to generate prefetch addresses for filling use-once storage 74. A particular interval is added to a previously generated prefetch address, generating a second prefetch address. The next consecutive interval within interval buffer 76 is added to the second prefetch address to generate a third prefetch address, etc. When the last interval within interval buffer 76 is used to generate a prefetch address, the first interval is used once again to generate a prefetch address. Data words stored at each of the prefetch addresses may be fetched into use-once storage 74 for use by subsequent addresses conveyed upon address bus 60. Since the intervals are a record of intervals between consecutive addresses previously presented to use-once cache 35A, if subsequent accesses use the same pattern of intervals in consecutive accesses then use-once storage 74 may be storing the values. A prefetch pointer 84 indicates the storage location within interval buffer 76 to be used to generate the next prefetch address. When the indicated interval is used, prefetch pointer 84 is incremented to indicate the next consecutive interval stored within interval buffer 76. If incrementing prefetch pointer 84 results in indicating a storage location which is not storing a valid interval (as indicated by buffer depth register 80), then prefetch pointer 84 is adjusted to indicate the storage location storing the first interval value (i.e. the value stored at the top of interval buffer 76).

Control unit 70 additionally maintains a compare pointer, shown as reference number 82 in FIG. 4. Compare pointer 82 indicates the interval within interval buffer 76 to be compared to the interval generated by control unit 70 upon receipt of an address on address bus 60. Control unit 70 generates the interval to be compared by subtracting the address stored in last address register 78 from the address conveyed upon address bus 60. When an address is conveyed, control unit 70 calculates the interval and compares the calculated interval to the interval stored in the storage location within interval buffer 76 indicated by compare pointer 82. Additionally, the calculated interval is compared to the interval stored at the top of interval buffer 76 (i.e. the interval which was stored into interval buffer 76 prior to any of the other intervals stored therein). The interval at the top of the buffer may always be stored in a particular storage location, or may be indicated by yet another pointer (not shown).

If the calculated interval compares equal to the interval indicated by compare pointer 82, control unit 70 increments the compare pointer to indicate the storage location storing the next consecutive interval. If incrementing compare pointer 82 causes compare pointer 82 to indicate a storage location not currently storing a valid interval, then compare pointer 82 is adjusted to point to the top of interval buffer 76. Consecutive address intervals calculated by control unit 70 comparing equal to consecutive intervals stored in interval buffer 76 indicates that the pattern of intervals stored in interval buffer 76 is still correct.

If the calculated interval compares equal to the interval stored at the top of the buffer, then compare pointer 82 is adjusted to indicate the interval which is second to the top of interval buffer 76. Comparing equal to the top of the buffer is an indication that a pattern of accesses (wherein the interval between the accesses within the pattern is irregular) has begun repeating. The indication of repetition is confirmed if subsequent intervals calculated by control unit 70 match the subsequent intervals indicated in interval buffer 76. Therefore, the compare pointer begins monitoring the stored intervals from the second stored interval in order to determine if the pattern continues to repeat.

If the calculated interval does not compare equal to the interval indicated by compare pointer 82 and furthermore does not compare equal to the interval stored at the top of interval buffer 76, then the calculated interval is compared to each other interval within interval buffer 76. If the interval compares equal to one of the other intervals, the storage location storing that interval is made the top of interval buffer 76. Compare pointer 82 is set to the second to the top interval. Prefetch pointer 84 is adjusted to the top of interval buffer 76, and the data within use-once storage 74 is discarded.

If the calculated interval does not compare equal to any intervals within interval buffer 76, control unit 70 stores the calculated interval into the storage location contiguous to the storage location indicated by compare pointer 82. In this manner, the calculated interval is added to the list of intervals. The buffer depth stored in buffer depth register 80 is adjusted to indicate that a new interval has been stored. The compare pointer is adjusted to indicate the storage location storing the new interval. Additionally, control unit 70 discards data in use-once storage 74 and begins prefetching using the address used by control unit 70 to calculate the new interval. The new interval is added to the address to create the first prefetch address. Prefetch pointer 82 is adjusted to the top of the buffer to begin generating subsequent addresses.

When the pattern of accesses performed by load/store unit 40 begins to change, the intervals stored in interval buffer 76 adjust to the new pattern of accesses. Each time an interval within the new pattern is detected, the interval is added to interval buffer 76 as described above. When interval buffer 76 becomes full, the interval stored at the top of interval buffer 76 is discarded and the interval which is second to the top of interval buffer 76 becomes the top. Intervals from the original pattern of accesses are continuously discarded in this manner until the new pattern repeats. When the first interval from the new pattern is detected again, the first interval becomes the top of interval buffer 76. Thereafter, the intervals stored in interval buffer 76 stabilize with the new pattern unless the pattern includes a larger number of intervals than interval buffer 76 may store.

Figure 5:
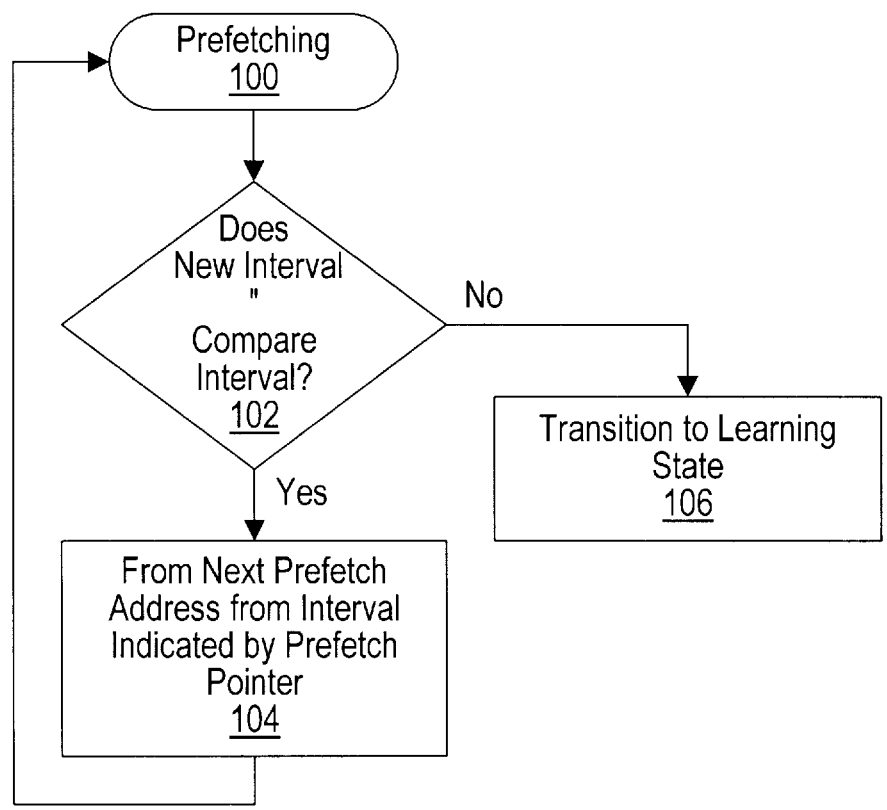
FIGS. 5 and 6 depict an exemplary state machine which may be implemented by the embodiment of the use-once data cache shown in FIG. 4.
Figure 6:
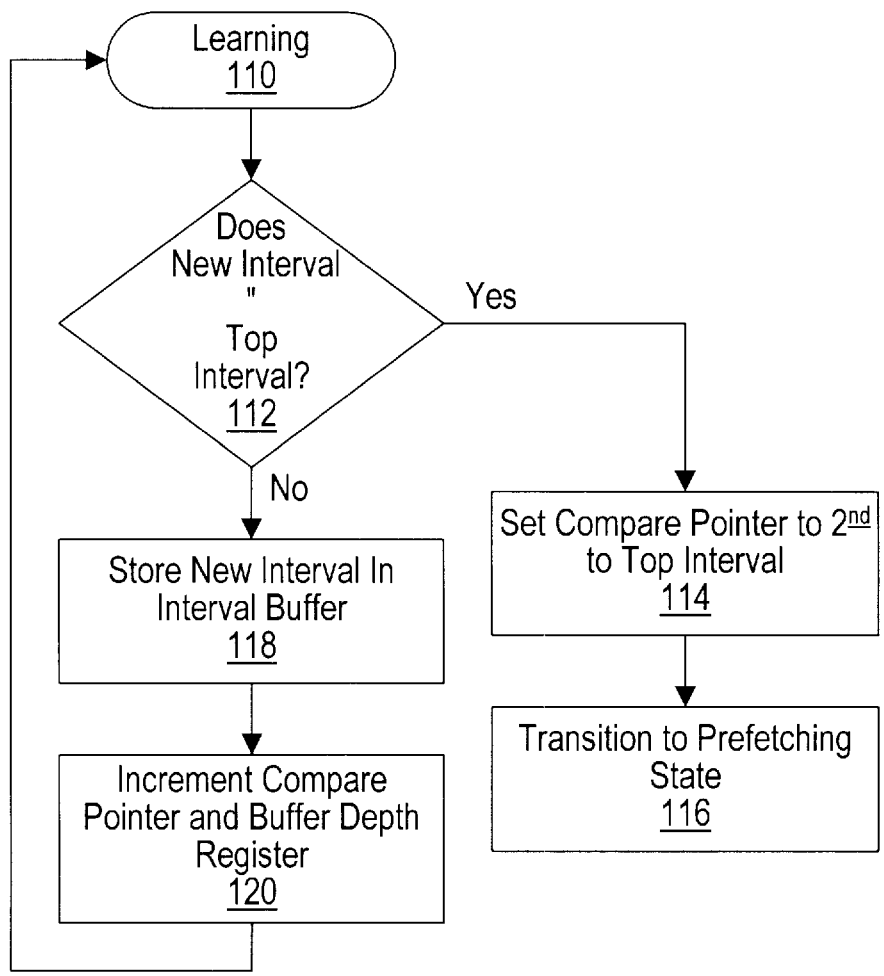

Turning next to FIGS. 5 and 6, an exemplary state machine which may be implemented by use-once cache 35A is shown. The exemplary state machine includes two states: a prefetching state and a learning state. During the prefetching state, prefetch addresses are generated using the pattern of intervals stored in interval buffer 76. During the learning state, the pattern of intervals stored in interval buffer 76 is learned by monitoring the intervals between addresses presented upon address bus 60. The state machine approach may simplify the implementation of control unit 70 by separating the learning of new patterns and the generation of prefetch addresses. In contrast, the operation of control unit 70 as described in FIG. 4 performs learning and prefetch functions simultaneously.

FIG. 5 depicts the actions of the prefetching state. The prefetching state is indicated by start block 100. During the prefetching state, control unit 70 generates a new interval each time an address is presented upon address bus 60. The new interval is compared to the interval indicated by compare pointer 82 (decision block 102). If the new interval is equal to the interval indicated by compare pointer 82, then control unit 70 remains in the prefetching state. A next prefetch address may be generated (block 104). The next prefetch address is formed from the interval indicated by the prefetch pointer. Additionally, the prefetch pointer is incremented.

If decision block 102 indicates that the new interval does not compare equal to the interval indicated by compare pointer 82, then the pattern of intervals stored in interval buffer 76 may no longer represent the pattern of intervals being generated by the instruction code executed by microprocessor 12. Therefore, control unit 70 transitions to the learning state (block 106). The new interval is stored as the top interval in interval buffer 76, and other intervals stored therein are discarded. Additionally, data stored in use-once storage 74 is discarded. Buffer depth register 80 is set to indicate a buffer depth of one, and compare pointer 82 is set to indicate the storage location within interval buffer 76 contiguous to the storage location storing the top of interval buffer 76.

Turning now to FIG. 6, learning state 110 is depicted. When control unit 70 receives an address upon address bus 60, it calculates a new interval by subtracting the last address stored in last address register 78 from the address. The new interval is compared to the interval stored at the top of interval buffer 76 (block 112). If the new interval is equal to the top interval, then the pattern of accesses may be repeating. Control unit 70 sets the compare pointer to the second to the top interval (block 114), such that control unit 70 may monitor subsequent intervals to ensure that the pattern stored in interval buffer 76 continues to be repeated. Control unit 70 then transitions to the prefetching state (block 116), and may begin prefetching using the most recently conveyed address and the second to the top interval stored in interval buffer 76.

Conversely, the new interval may not compare equal to the top interval stored in interval buffer 76. Therefore, the new interval may form a portion of the pattern of intervals being learned by use-once cache 35A. The new interval is stored into interval buffer 76 in the storage location indicated by compare pointer 82 (block 118). Compare pointer 82 is then incremented, as well as buffer depth register 80.

It is noted that compare pointer 82 and prefetch pointer 84 are described as being incremented in the above discussion. As noted in FIG. 4, if incrementing either pointer causes the pointer to indicate a storage location storing invalid interval data (as indicated by the value stored in buffer depth register 80), then that pointer is adjusted to indicate the storage location currently forming the top of interval buffer 76.

It is noted that, although the above discussion uses the x86 microprocessor architecture by way of example, the present invention is not limited to use with microprocessors employing this microprocessor architecture. Instead, any microprocessor architecture may employ the features and advantages of the present invention. It is further noted that, although the above description utilizes an addressing mode to distinguish use-once data from ordinary data, other mechanisms may be employed to provide such distinction. For example, different instruction encodings may be used to identify use-once versus ordinary data. It is still further noted that, although a single use-once storage 54 is shown in the embodiment of FIG. 3, other embodiments of use-once cache 35 may employ multiple use-once storages. Each use-once storage has an associated SIB register, and may be used to store a different set of data words. In this manner, multiple streams of use-once data may be stored simultaneously. It is additionally noted that prefetch addresses may be generated at a rate of one every N clock cycles, where N is an integer greater than zero. The choice of N is dependent upon the frequency of data accesses in microprocessor 12, and may be selected as a matter of design choice.

In accordance with the above disclosure, a use-once cache for a microprocessor has been described. The use-once cache may be used to store data which does not exhibit locality, thereby retaining data which does exhibit locality within a typical data cache coupled in parallel. Additionally, the data which is used once is prefetched, such that when the data is referenced (or accessed) it may enjoy cache hit memory access times even though the data may not be accessed again.

Numerous variations and modifications will become apparent to those skilled in the art once the above disclosure is fully appreciated. It is intended that the following claims be interpreted to embrace all such variations and modifications.

What is claimed is:

1. A cache comprising:
    a first bus configured to convey an address;
    a storage comprising a plurality of storage locations, wherein each of said plurality of storage locations is configured to store one of a plurality of data words, wherein each one of said plurality of data words is separated in memory from another one of said plurality of data words by one of a plurality of intervals; and
    a control unit coupled to said storage and to said first bus, wherein said control unit is configured to provide one of said plurality of data words upon a second bus if said one of said plurality of data words corresponds to said address, and wherein said control unit is configured to delete said one of said plurality of data words from said storage upon access by said address.

2. The cache as recited in claim 1 wherein each one of said plurality of intervals is a regular interval.

3. The cache as recited in claim 2 wherein said regular interval is specified by a scale value associated with said address, and wherein said scale value is multiplied by a first operand of an instruction corresponding to said address, and wherein a product of said multiplication is added to a second operand of said instruction, and wherein a sum of said addition comprises said address.

4. The cache as recited in claim 3 further comprising a register coupled to said control unit wherein said control unit stores said scale value within said register.

5. The cache as recited in claim 4 further comprising an address generation unit configured to generate a second address from said address and said scale value.

6. The cache as recited in claim 5 wherein said second address is generated by adding said address and said scale value.

7. The cache as recited in claim 5 wherein said control unit is configured to transfer a second data word from a main memory into said storage, wherein said second data word corresponds to said second address.

8. The cache as recited in claim 4 wherein said control unit is further configured to store a value indicative of a storage location storing said first operand in said register.

9. The cache as recited in claim 8 wherein said first operand comprises an index value.

10. The cache as recited in claim 4 wherein said control unit is further configured to store a value indicative of a storage location storing said second operand in said register.

11. The cache as recited in claim 10 wherein said second operand comprises a base value.

12. The cache as recited in claim 1 wherein each of said plurality of storage locations is configured to store one of a plurality of addresses, and wherein said one of said plurality of addresses corresponds to said one of said plurality of data words.

13. The cache as recited in claim 12 further comprising a comparator circuit coupled to said first bus and to one of said plurality of storage locations within said storage, wherein said comparator circuit is configured to compare said one of said plurality of addresses to said address, and wherein said one of said plurality of data words corresponds to said address if said comparator circuit indicates equality.

14. The cache as recited in claim 1 wherein said plurality of intervals comprises a pattern of irregular intervals by which addresses conveyed upon said first bus vary.

15. The cache as recited in claim 14 further comprising a second storage configured to store said plurality of irregular intervals.

16. The cache as recited in claim 15 wherein a first one of said plurality of irregular intervals is used to form a first prefetch address.

17. The cache as recited in claim 16 wherein a second one of said plurality of irregular intervals is used to form a second prefetch address, and wherein said second prefetch address is formed subsequent to said first prefetch address, and wherein said second one of said plurality of intervals is stored within said second storage contiguous to said first one of said plurality of intervals.

18. A microprocessor comprising:
    a first data cache configured to store first data for access by said microprocessor in response to instructions executed by said microprocessor, wherein said first data cache is configured to retain said first data when said first data is accessed by said microprocessor;

a second data cache configured to store second data for access by said microprocessor in response to instructions executed by said microprocessor, wherein said second data cache is configured to discard said second data when said second data is accessed by said microprocessor; and a load/store unit coupled to said first data cache and said second data cache, wherein said load/store unit is configured to access said first data cache and said second data cache in response to load memory operations.

19. The microprocessor as recited in claim 18 further comprising a bus interface unit coupled to said first data cache and said second data cache, wherein said bus interface unit is configured to effect data transfers upon a system bus in response to said first data cache and said second data cache.

20. The microprocessor as recited in claim 19 wherein said bus interface unit is configured to effect a data transfer if said first data cache and said second data cache are not storing data corresponding to a load memory operation.

21. The microprocessor as recited in claim 18 further comprising an instruction decode unit, wherein said load/store unit is coupled to receive load and store memory operations from said instruction decode unit.

22. A method for operating a data cache comprising:

transferring data from a main memory to said data cache, said data comprising a plurality of data words wherein each one of said plurality of data words is separated within said main memory from another one of said plurality of data words by one of a plurality of regular intervals;

accessing one of said plurality of data words in response to execution of an instruction; and discarding said one of said plurality of data words in response to said accessing.

23. The method as recited in claim 22 wherein said transferring is performed in response to an address presented to said data cache by a load/store unit, wherein a data word corresponding to said address is found not to be stored within said data cache.

24. The method as recited in claim 22 wherein said accessing comprises receiving an address from a load/store unit and searching said plurality of data words for a data word corresponding to said address.

25. The cache as recited in claim 1 wherein said plurality of intervals comprises intervals of more than one size which form a repeating pattern and wherein said cache is configured to detect said repeating pattern.

26. The cache as recited in claim 25 wherein said cache is further configured to detect changes in said repeating pattern.

27. The cache as recited in claim 1 wherein said storage is configured to detect a first addressing mode indicative of use-once data, and wherein said storage is configured to store said one of said plurality of data words in response to said first addressing mode.

* * * * *